(12) United States Patent
Evans et al.

(10) Patent No.: US 6,391,231 B1
(45) Date of Patent: May 21, 2002

(54) METHOD FOR SIDE-FILL LENS CASTING

(75) Inventors: Russell E. Evans, Chino Hills; Thomas Balch, Rancho Palos Verdes; Nancy L. S. Yamasaki, Long Beach, all of CA (US)

(73) Assignee: Younger Mfg. Co., Torrance, CA (US)

( * ) Notice: Subject to any disclaimer, the term of this patent is extended or adjusted under 35 U.S.C. 154(b) by 0 days.

(21) Appl. No.: 09/447,445

(22) Filed: Nov. 22, 1999

Related U.S. Application Data

(60) Provisional application No. 60/109,498, filed on Nov. 23, 1998.

(51) Int. Cl.$^7$ .................................................. B29D 11/00
(52) U.S. Cl. .......................... 264/1.7; 264/2.5; 425/808
(58) Field of Search .......................... 264/1.1, 1.7, 2.5; 425/808

(56) References Cited

U.S. PATENT DOCUMENTS

| | | | |
|---|---|---|---|
| 3,136,000 A | 6/1964 | Slyk | |
| 3,846,013 A | * 11/1974 | Cohen | |
| 3,881,683 A | 5/1975 | Whitney | 249/117 |
| 4,085,919 A | 4/1978 | Sullivan | |
| 4,090,830 A | 5/1978 | Laliberte | 425/117 |
| 4,227,673 A | 10/1980 | Goodwin et al. | 249/117 |
| 4,251,474 A | 2/1981 | Blandin | 264/1.1 |
| 4,441,795 A | 4/1984 | Lobdell | 351/169 |
| 4,522,768 A | 6/1985 | Roscrow et al. | 264/2.2 |
| 4,693,446 A | 9/1987 | Orlosky | 249/53 R |
| 4,789,318 A | 12/1988 | Ehritt | 425/130 |
| 4,873,029 A | 10/1989 | Blum | 264/1.3 |
| 5,529,728 A | 6/1996 | Buazza et al. | 264/1.38 |
| D434,050 S | * 11/2000 | Su | |

FOREIGN PATENT DOCUMENTS

| | | |
|---|---|---|
| JP | 59169820 | 9/1984 |
| JP | 09300478 | 11/1997 |

* cited by examiner

Primary Examiner—Mathieu D. Vargot
(74) Attorney, Agent, or Firm—Lyon & Lyon LLP

(57) ABSTRACT

Unique side-fill mold assembly and method for making a lens wherein the mold assembly includes a gasket having a plurality of side port holes which allow filling of the mold assembly with a thermosetting resin and allow egress of air trapped within the mold assembly.

17 Claims, 7 Drawing Sheets

FIG. 1A
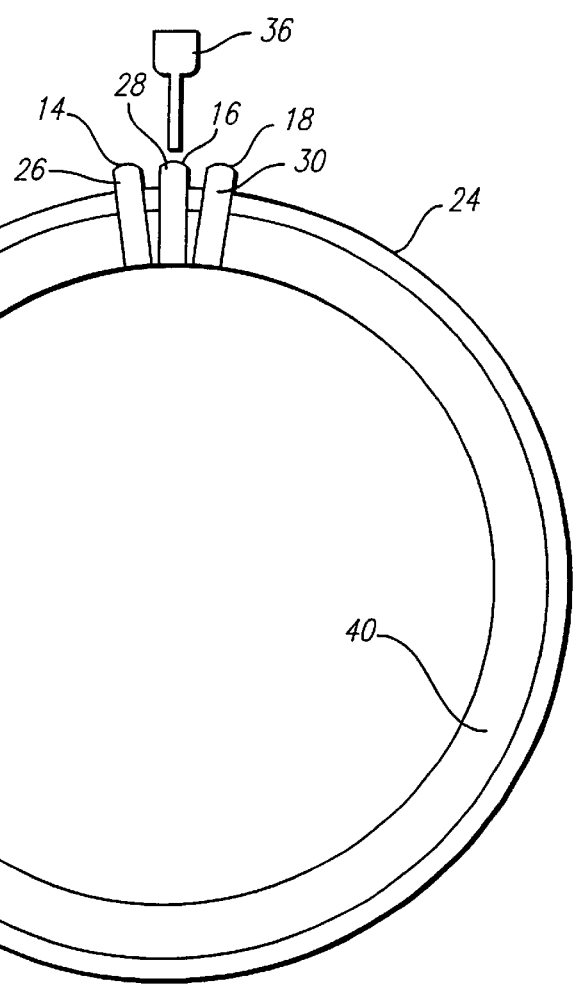
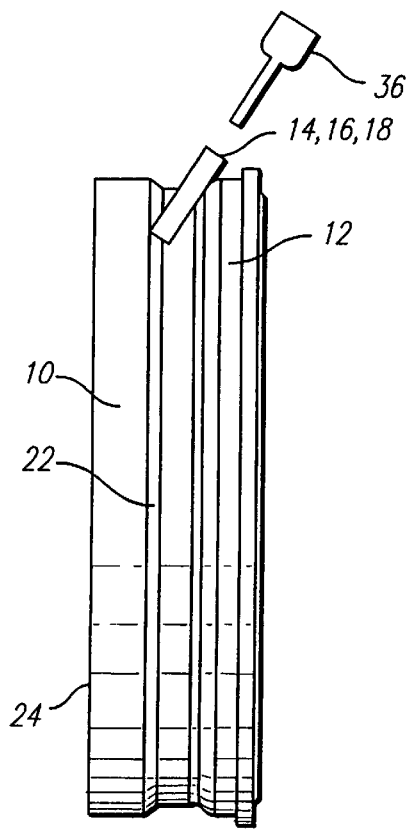
FIG. 1B

METHOD FOR SIDE-FILL LENS CASTING

CROSS-REFERENCE WITH RELATED APPLICATIONS

This application claims the benefit of U.S. Provisional Application 60/109,498 filed Nov. 23, 1998.

BACKGROUND OF THE INVENTION

1. Field of the Invention

The invention relates generally to a method and apparatus for side-fill manufacturing of lenses.

2. Description of Related Art

In manufacturing lenses and particularly those lenses made with thermosetting resins in mold assemblies, it is essential to distribute the resin for good replication of mold surfaces. However, when an embedded layer, such as a polarizing film or wafer, is positioned within the mold assembly it hinders resin distribution. This hindrance results in poor resin coverage on the front surface of the embedded layer, which leads to damage in subsequent processing. Additionally, non-uniform resin distribution results in displacement or distortion of the embedded layer, ruining the product lens. Furthermore, uneven resin distribution causes the trapping of air within the mold assembly, which also ruins the product lens. There have been attempts to avoid the problems associated with resin distribution around embedded layers. It has been reported that embedded layers have tabs or cut-outs along the layer's edge to allow flow of a thermosetting resin from one side of the layer to the other. [Roscrow, et al., U.S. Pat. No. 4,522,768]. It has also been reported to use shims under a polarizer or use tab cuts in a polarizer to allow resin flow around the embedded layer. [Laliberte, U.S. Pat. No. 4,090,830]. A lens manufacturing process has been reported which allows sequential resin introduction into a mold, the placement of an embedded layer, followed by a second resin introduction into the mold. [Blum, U.S. Pat. No. 4,873,029]. The sequential layered construction disclosed is time consuming and therefore more susceptible to error and variation. Thus, the features disclosed are insufficient to achieve high yields because of non-uniform distribution and uncertainty of repeatability of positioning.

Another problem associated with the use of thermosetting materials for casting lenses is the control of the precise distribution of resin within the mold assembly. For example, an equal thickness of thermoset resin may be desired in making finished plano lenses. However, a controlled but unequal distribution of resin may be desired in making a semi-finished lens blank, which may be further surfaced to ophthalmic prescriptions.

Yet another problem associated with manufacturing lenses in mold assemblies is that gases are often entrapped within the mold assembly. A gasket having two identical fill/vent holes has been reported [Orlosky, U.S. Pat. No. 4,693,446]. However, Orlosky required the fill vent holes to be at the top of the gasket, requiring the exhaust air, as well as the reactive monomer mixture, to execute a right angle turn to a narrowed channel. Orlosky also required the fill/vent holes to be located in diametrically opposed positions and did not discuss the added complication of distribution around an embedded layer.

The present invention avoids the problem of gas entrapment without resorting to openings on opposite sides of the gasket. This enables better manufacturing flexibility, with less complicated handling and mold assembly design. Thus, although there have been attempts to solve the gas entrapment problem, none of the attempts discuss or address the added complication of distribution around an embedded layer with thermosetting resins.

Multiple or branched channels have been reported for delivery of different thermoplastic materials to injection molding systems [Ehritt, U.S. Pat. No. 4,789,318]. However, thermoset resins used in the present invention must be processed in an entirely different way than the thermoplastic materials of Ehritt, due to their opposite responses to increased temperature, e.g., thermosets harden while thermoplastics flow. Indeed, in thermoplastic processing, no flexible gasket is used and most operations occur at an increased temperature and pressure. Therefore, the Ehritt patent is not a suitable process for the thermoset processing of the present invention.

The apparatus and method of lens manufacture of the present invention allows equal or controlled differential, even sequential, distribution of thermosetting resin material, particularly around an embedded layer. While tabs or cut-outs in the embedded layer may be used to enhance this distribution, the present invention also allows controlled and distinctly improved delivery of thermosetting resin material when the embedded layer is impermeable. Since the present invention allows for reproducible and controlled delivery of a thermosetting material to both sides of an embedded layer, a lens can be manufactured with different optical or material properties on either side of the embedded layer.

Another benefit of the present invention is that more thermosetting material may be preferentially delivered to the back surface of the semi-finished lens while assuring the front surface is filled. Yet another benefit of the present invention is the control of distribution of the thermosetting resin material by the alteration of angle and the placement of port holes.

The importance of a controllable method and apparatus for side-fill manufacturing of lenses makes this method and apparatus amenable to a wide variety of applications such as reproducible positioning of embedded film in finished plano lenses, reproducible positioning of embedded film in semi-finished lenses, and reproducible introduction of a different compositions of materials to different sides of the embedded layer. For example, the invention enables the introduction of a composition comprising regular thermoset materials or higher impact-resistant materials to the back layer of the lens and introduction of a composition comprising the following materials, or a mixture of the following materials in front of the embedded layer: regular thermoset resin; higher impact-resistant material; abrasion-resistant material; photochromic material; tinted resin; high viscosity material; lower refractive index material; or higher refractive index material. The present invention may also be used to introduce thermoset materials containing inorganic or organic particles for increased hardness, or containing inorganic or organic colorants.

The present invention is also amenable to automatic or manual filling techniques. In automated filling processes, the port holes can be fitted with fill sensors to signal when the lens chamber is full and when the thermoset monomer flow can cease. Port holes can also be fitted with temperature or viscosity sensors to monitor and control the curing process. Similarly, port holes can be used to pull vacuum on the mold assembly for the removal of entrapped gases.

BRIEF SUMMARY OF THE INVENTION

The invention described herein has overcome many of the deficiencies of the prior art noted above. The present invention provides a method of casting thermoset lenses that allows for the filling of the a mold assembly and for the egress of trapped gases within the mold assembly.

In particular, the method for making a thermoplastic lens comprises providing a composition comprising a thermosetting resin. A gasket means is obtained which supports mold members of a lens casting mold. The gasket means comprises an annular body formed by a cylindrical wall which has an inside surface and an outside surface; a plurality of port holes on the outside surface of the wall, each of the holes has a face surface on the outside surface and a passageway which extends therethrough. Each of the passageways has one end in the face surface of the port through which the passageway extends, and another end extends through the wall and opens at the lens chamber. The composition is placed in the passageway and the mold is filled. The side port holes are used for filling or venting of the lens chamber and can also be used for sensor positions.

These and other features, aspects, and advantages of the present invention will become better understood with regard to the following detailed description, appended claims, and accompanying drawings.

BRIEF DESCRIPTION OF THE DRAWINGS

FIG. 1A is a top view of a side-fill molding apparatus of the present invention;

FIG. 1B is a side view of a side-fill molding apparatus of the present invention;

DETAILED DESCRIPTION OF THE INVENTION

Figure 2A:
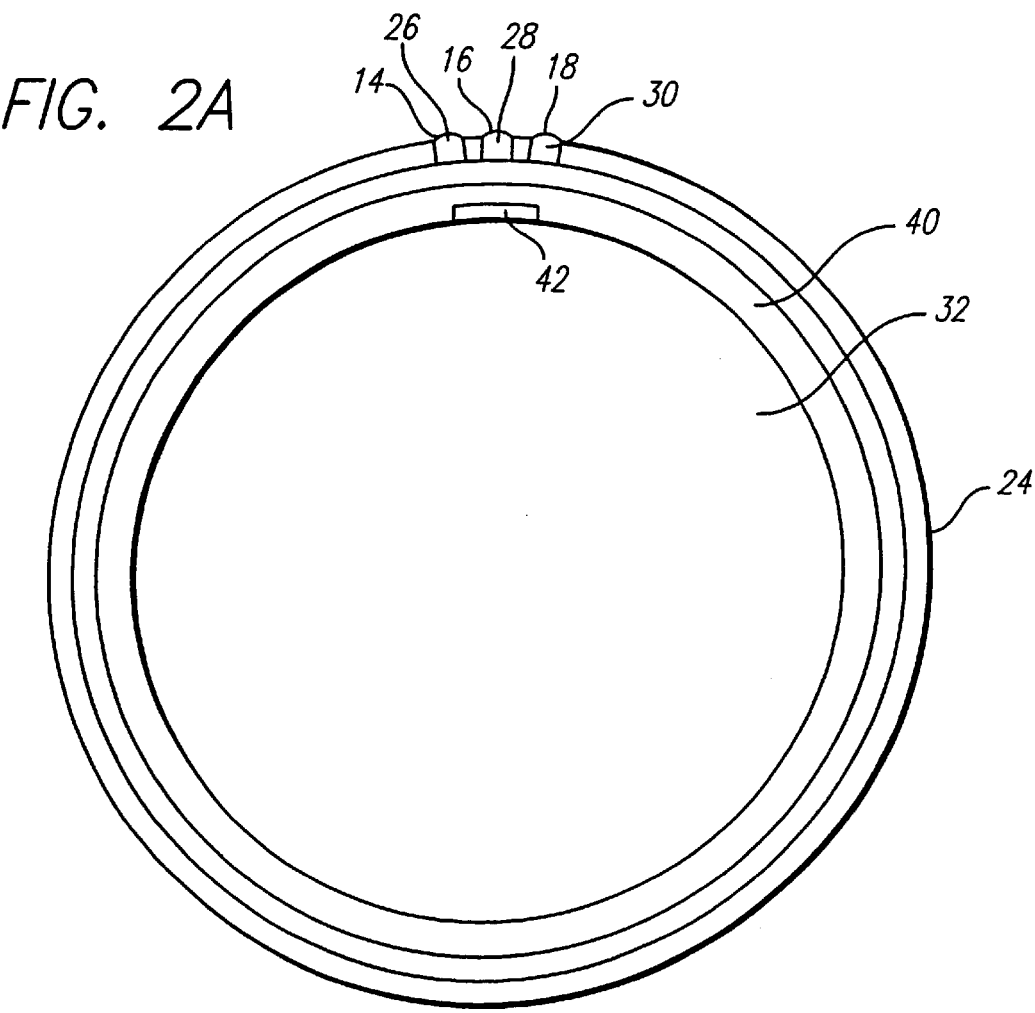
FIG. 2A is a top view of a side-fill molding apparatus for the manufacture of thin lenses, specifically a NUPOLAR® (of Younger Mfg. C.) 2.2 plano 6 base lens.

A new and improved gasket has been developed for supporting the mold members of a thermoset lens casting mold assembly and for allowing the filling of the mold and egress of trapped gases within the mold.

A mold assembly for side-fill manufacturing of a lens in accordance with this invention is shown in FIG. 1A–1B. The mold assembly is used for molding plastic lenses and includes front 10 and back 12 mold members. The mold members 10, 12 are typically made of glass and have surfaces which are selected to provide a desired curvature on either side of a finished lens or semi-finished lens blank. The mold members 10, 12 are spaced from one another by a gasket means 24 to define and seal a lens chamber 22 within which a lens is to be cast.

The gasket means 24 is constructed by standard molding techniques and is made of a flexible polymeric material, compatible with the composition comprising the thermoset resin used to make the lens. A rubber compound, sold under the trademark Kraton G7720-9001 by Shell Chemical Corp and an ethylene vinyl acetate copolymer sold under the trademark Elvax by E. I. Dupont de Nemours & Co. have been found to be a preferred material for use in making the gasket means 24. The gasket means 24 comprises an annular body formed by a cylindrical wall having an inside surface and an outside surface; an annular shoulder 40 is formed on the inside surface which accommodates and seals the edges of the two mold members 10, 12, a plurality of port holes 14, 16, 18 on the outside surface of the wall and a passageway 26, 28, 30 extending therethrough; and each passageway 26, 28, 30 have one end in the face surface of said holes 14, 16, 18 through which the passageway 26, 28, 30 extends, and another end extending through the wall and opening at the lens chamber 22. The port holes 14, 16, 18 may be flush with the surface of the outside surface of the wall or may be protrusions extending outward from the wall. available thermoset resin monomer may be used for making the product lens such as CR-39® (a thermoset resin produced from allyl digycol carbonate and manufactured by PPG). Methacrylic resins, specialty thermosetting polymers, and other ophthalmic resins such as the trademarks, NS200, NS205, or NS207, produced by Akzo Nobel may also be used. As used in this invention, a composition comprising any commercially available thermoset resin monomer may be used for making the product lens such as CR-39® (a thermoset resin produced from allyl digycol carbonate and manufactured by PPG). Methacrylic resins, specialty thermosetting polymers, and other ophthalmic resins such as the trademarks NS200, NS205, or NS207, produced by Akzo Nobel may be also be used. A composition comprising a thermosetting material, as described above, or a combination of the thermosetting material and at least one of an impact-resistant material, an abrasion-resistant material, a photochromic material, a tinted material, a high viscosity material, a low refractive index material, or a high refractive index material, may be used for making the product lens. The thermoset resin material may also comprise particles or additives that alter the material's physical properties, e.g., hardness, color, surface tension, among others. A delivery means for delivering the composition can be a needle, tube, pipette, nozzle or other container shaped to closely fit the fill port hole.

Curing techniques for thermoset resins are well known in the art, thus, the lens may be cured by any standard thermoset curing method, including heat, UV, and the use of other energy sources. Prior U.S. patents showing the use of two glass mold halves to form a molding cavity for a plastic resin are Greshes, 4,190,621 and Godwin, et al., 4,227,673. The cure method may be optimized to yield lenses of desired hardness.

As used in this invention, the embedded layer 32 is meant to include a polarizer, photochromic material, tinted material, impact-resistant material, material having special light adsorption characteristics, or a material having light-controlling characteristics. The embedded layer 32 may be continuous, impermeable, or with permeability or openings that allow the resin to flow through the embedded layer 32. The embedded layer 32 may also have tabs or cut-outs 42.

A polarizing film cut to size of a lens diameter was used as the embedded layer in Examples 1 to 6. The polarizing film was placed within the lens chamber 22 of a lens assembly comprising two mold members, a front mold 10 and a back mold 12, and a surrounding gasket means 24 which spaced the two mold members 10, 12 away from each other in order to form the lens chamber 22. The gasket means 24 supported the polarizing film 32 in a fixed position and provided an edge seal around the assembly. The gasket means 24 was designed with port holes 14, 16, 18 that acted as fill/entry holes and vent holes to controllably introduce lens thermoset monomer material into the lens chamber 22, and allow removal of displaced gases.

A plug 34 may be inserted into the port holes 14, 16, 18 to close the assembly for curing. The plug 34 may be spring-loaded or otherwise actively controlled to ensure that is remains seated during the curing process, and adjusted for shrinkage or expansion of the thermosetting resin material.

The number of port holes 14, 16, 18, required for the most effective lens manufacture depended on the type and thickness of the lens and the lens composition used. More vent holes 14, 16, 18 may be required for the manufacture of thicker lenses or with the use of a viscous lens composition.

The range of angle of the port holes 14, 16, 18 varied from about 0° to about −90°, with a 10° tolerance at any given angle. The angle used depended on the lens type, e.g., thick or thin, the lens composition, and the radius of curvature of the front lens surface. A 0° angle from horizontal is an angle straight in through the side of the gasket means 24. A −90° angle from horizontal is an angle perpendicular to the edge of the lens, toward the back surface of the back mold member 12.

In general, fill port angles of about −10° to about −90° are used to direct the lens composition around an embedded layer to both the front and back surfaces of the lens, or to ensure a good directional flow toward the front lens surface. Shallower angles (e.g., in the range of about 0° to about −45°) are used for flatter lenses (e.g., lenses with lower optical diopter values, or longer radii of curvature) for the introduction of different thermoset materials on each side of the embedded layer, and for more viscous thermosetting materials. A steeper angle (from about −20° to about −90°) is used for more steeply curved front surfaces (e.g., lenses with higher diopter values, or shorter radii of curvature) and less viscous thermoset monomers. For thicker lenses, one may decrease the angles 5 to 15° to further allow more lens composition to flow toward the back surface of the lens.

Vent port angles may be the same or different from the fill port angles. In general, vent port angles will be determined by convenience in gasket design, requirements for sensors, or positioning restraints for location of multiple port holes and/or sensors across the gasket wall.

The size of the port holes 14, 16, 18 used differ depending on the thickness of the lens. The size of the port holes 14, 16, 18 used in a single gasket may be the same or differ. Vent holes need not be smaller than the fill holes, but are preferred to be smaller to reduce loss of lens composition. For example, with the slotted fill design, the fill port is approximately 1 cm wide by 1 to 2 mm thick, while the vent ports are in the range of about 0.3–3 mm in diameter. Similarly, the shape of the port holes depend on the lens to be assembled. For thin lenses, such as 2.2 mm thick planos, fill ports must be smaller than the thickness of the lens. Broad, flat fill ports may be used for more viscous lens materials. Round or elongated ports allow the lens material to flow more easily on both sides of an embedded layer. Also, baffled, separated, or pinched port holes may be used to introduce different lens materials to different sides of a lens having an embedded layer.

The lenses made in the following examples were approximately 76 mm in diameter, having a variation of ±0.50 mm. The thick lenses were designed for a given thickness of between about 9 to 13.5 mm, with a variation around the given thickness of ±0.50 mm. The thin lenses were about 2.2 mm thick, ±0.30 mm. In all instances the embedded layer was placed approximately 0.80 mm ±0.40 mm from the front surface of the lens.

EXAMPLE 1

Figure 2B:
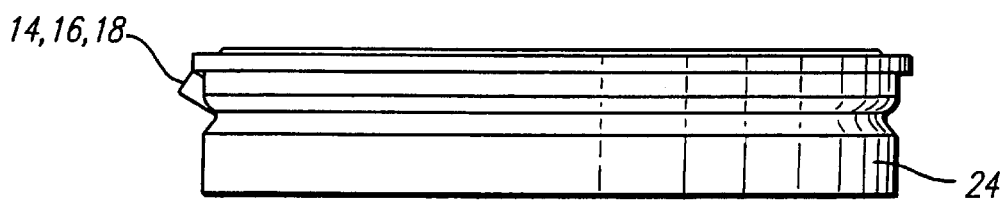
FIG. 2B is a side view of a side-fill molding apparatus for the manufacture of thin lenses, specifically a NUPOLAR® (of Younger Mfg. C.) 2.2 plano 6 base lens.
Figure 4A:
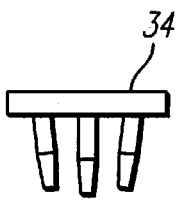
FIG. 4A is a top view of three insertable plugs for the port holes of this invention.
Figure 4B:
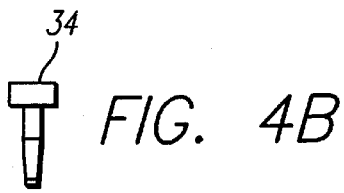
FIG. 4B is a top view of an insertable plug for a port hole of this invention.

Three port holes 14, 16, and 18, as configured in FIGS. 2A and 2B, pierced the gasket means 24 along the edge axis of the embedded layer 32. The lens assembly was prepared. A needle 36 was inserted into the central port 16 of the gasket means 24 to admit the composition of a variant of CR-39® type hard resin thermoset monomer along the passageway 28 to the lens chamber 22 of the mold assembly. Two side port holes 14 and 18 acted as vent holes and allowed egress of trapped gases within the assembly as the thermosetting resin material filled the enclosed lens chamber 22. A plug 34, as seen in FIG. 4A, was then inserted into the three port holds 14, 16, and 18 to reduce the loss of thermosetting material. After standard thermoset curing, the gasket means 24 was removed.

RESULTS OF EXAMPLE 1

The final lens product showed no displacement of the embedded layer 32, and no gas bubbles within the lens.

EXAMPLE 2

Figure 3A:
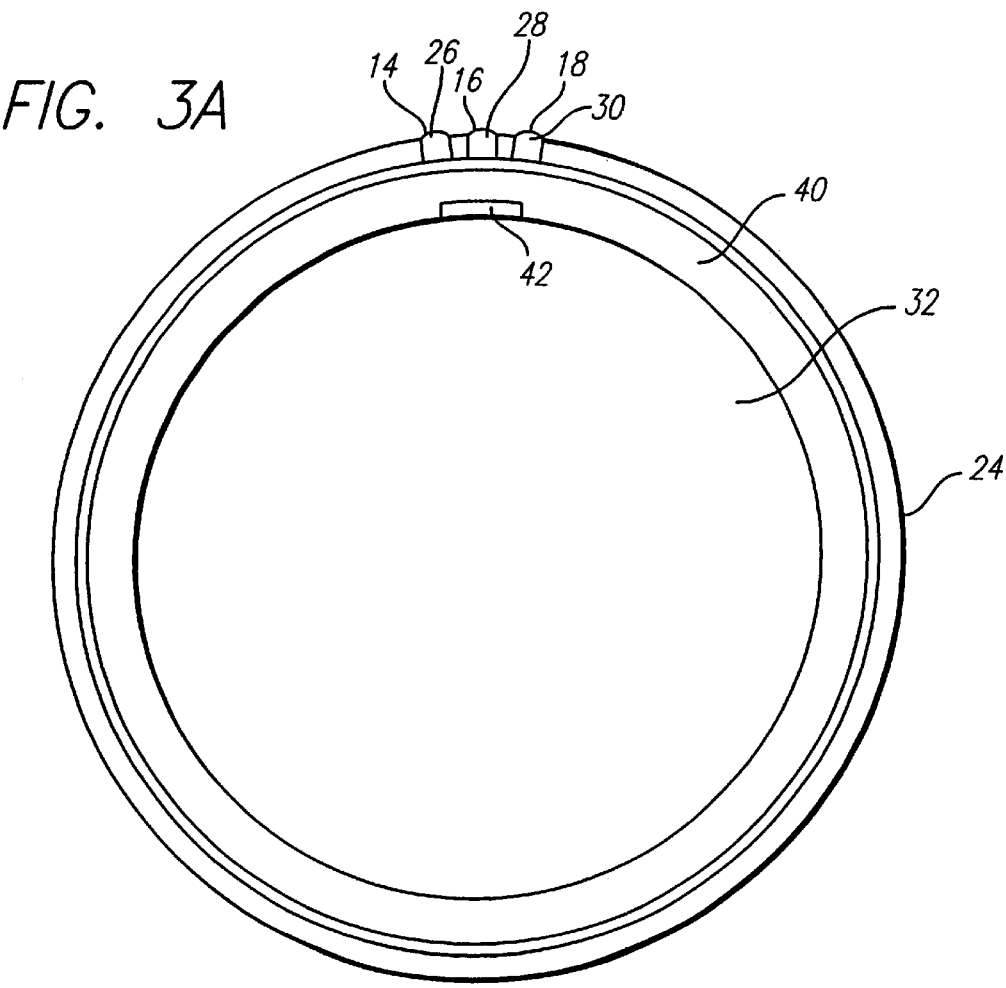
FIG. 3A is a top view of a side-fill molding apparatus for the manufacture of thick lenses, specifically a NUPOLAR® (of Younger Mfg. C.) tri focal for 4, 6, or 8 base lenses.
Figure 3B:
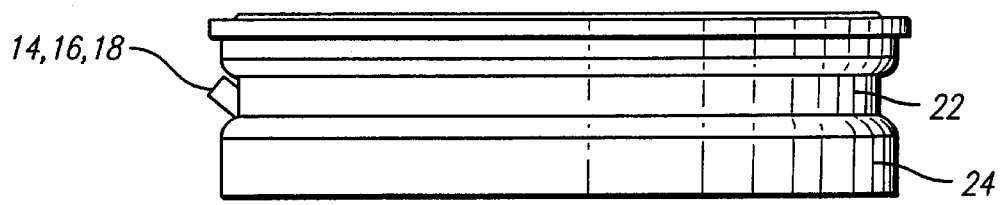
FIG. 3B is a side view of a side-fill molding apparatus for the manufacture of thick lenses.

The procedure of Example 1 was followed by substituting a gasket means 24 with larger spacings between the mold surfaces, as seen in FIGS. 3A and 3B, in order to form a thicker lens.

RESULTS OF EXAMPLE 2

The final lens product showed no displacement of the embedded layer 32. However, some lenses showed gas bubbles trapped in the front surface of the lens with this filling assembly.

EXAMPLE 3

Figure 5A:
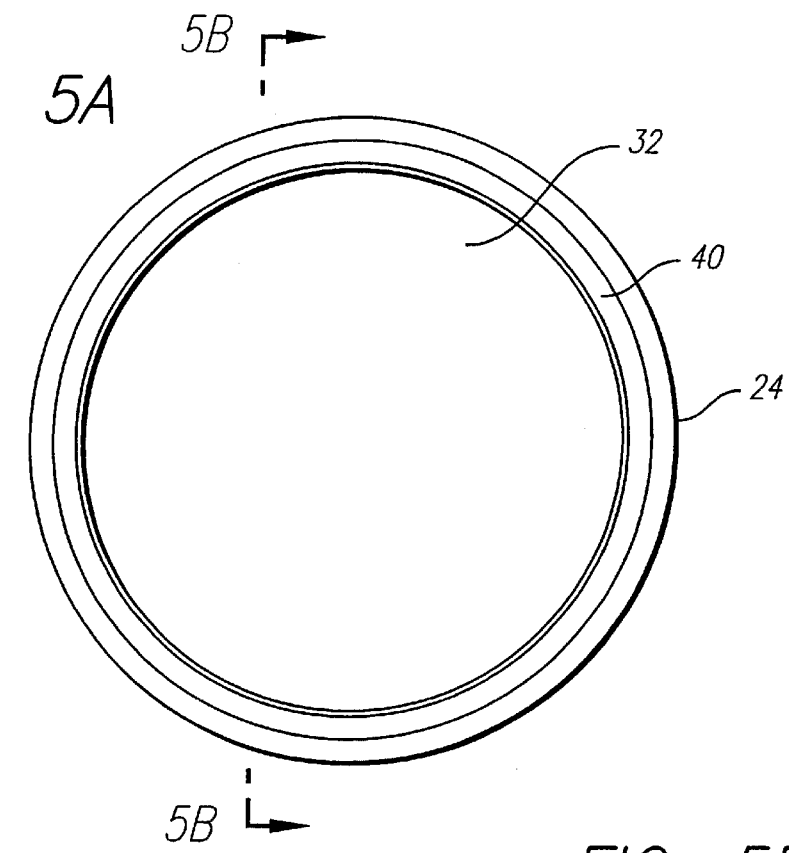
FIG. 5A is a top view of a side-fill molding apparatus having a single vent port and a larger diameter fill port.
Figure 5B:
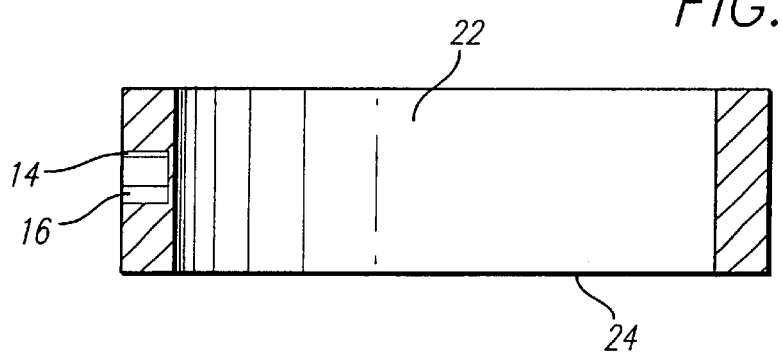
FIG. 5B is a side view, partial cross section, of a side-fill molding apparatus having a single vent port and a larger diameter fill port.
Figure 5C:
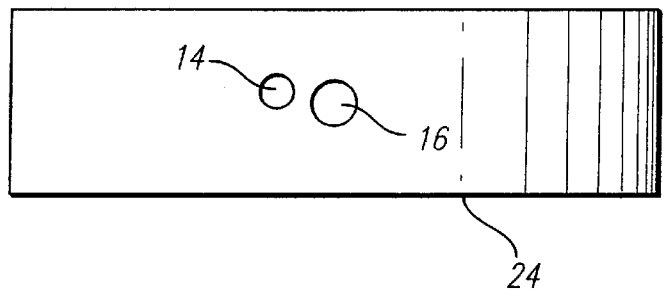
FIG. 5C is a front view of a side-fill molding apparatus having a single vent port and a larger diameter fill port.

Two port holes 14, 16 pierced the gasket along the outside wall of the gasket means 24, as seen in FIGS. 5A–5C. One of the port holes 16 acted as a fill hole and was located along the edge axis of the embedded layer 32. The other port hole 14 acted as a vent hole and was located below the edge axis of the embedded layer 32. The lens assembly was prepared.

Two port holes 14, 16 pierced the outside wall of the gasket means 24, as seen in FIGS. 5A–5C. One of the port holes 16 acted as a fill hole and was located along the edge axis of the embedded layer 32. The lens assembly was prepared. A needle 36 was inserted into the fill hole 16 to admit the composition to a variant of CR-39® type hard resin thermoset monomer along the passageway 28 to the lens chamber 22 of the mold assembly. The filled port 16 was larger in diameter than the vent hold port 14. The vent hole 14 allowed egress of trapped gases within the assembly as the thermosetting resin filled the enclosed lens chamber 22. The plug 34, as used in Example 1, was not used in this Example. After standard thermoset curing, the gasket was removed.

RESULTS OF EXAMPLE 3

The final product lens showed no displacement of the embedded layer 32 and no gas bubbles within thicker portion of the lens where the vent hole 14 was located. Some gas bubbles were observed in the unvented area of the lens, within the thinner portion of the lens, indicating the importance of proper side-fill design.

EXAMPLE 4

Figure 6A:
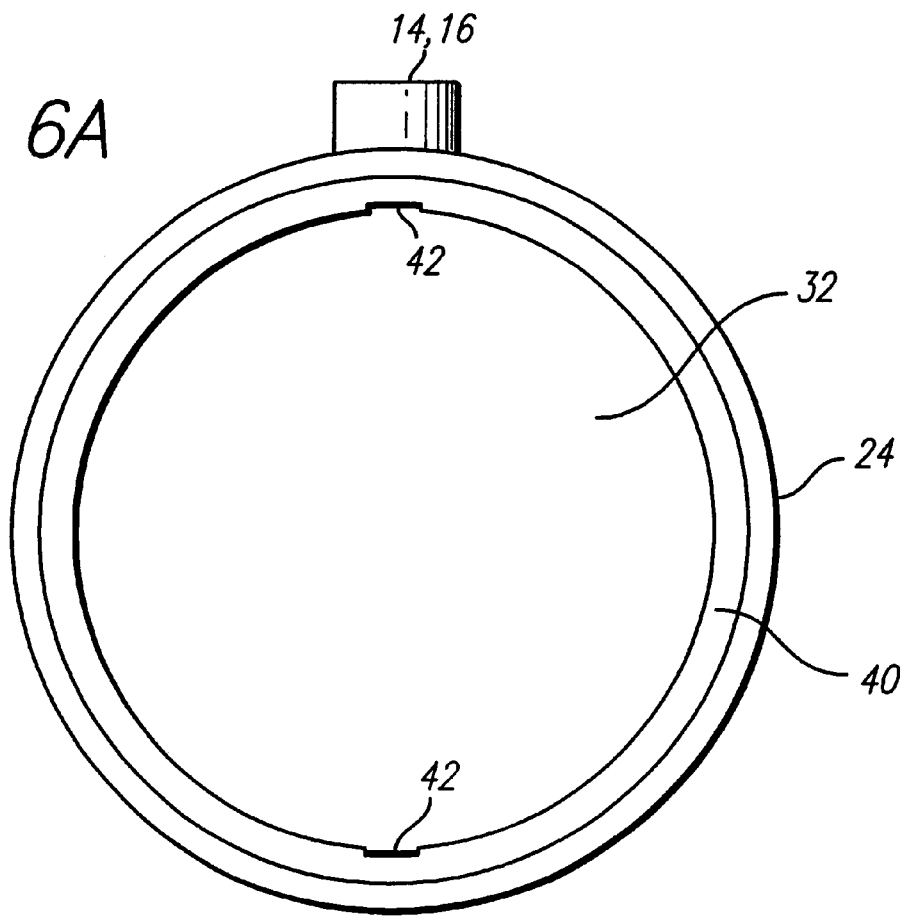
FIG. 6A is a top view of a side-fill molding apparatus having a single side vent port and a fill port with a diameter greater than the thickness of an embedded layer.
Figure 6B:
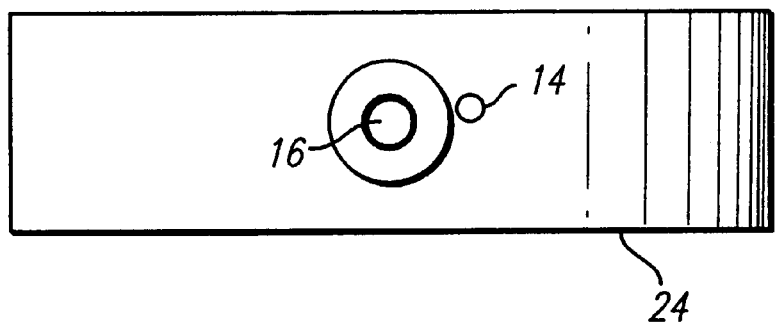
FIG. 6B is a front view of a side-fill molding apparatus having a single vent port and a fill port with a diameter greater than the thickness of an embedded layer.

In this example, a circular shaped port hole 16 acted as the fill hole and was centered along the edge axis of the embedded layer 32, as seen in FIGS. 6A–6B. The fill port 16 was of greater diameter than the thickness of an embedded layer 32. A round shaped filling tube 36, shaped to closely fit the fill port 16, was inserted into the fill hole 16 to admit the composition of a variant of CR-39® type hard resin thermoset monomer along the passageway 28 to the lens chamber 22 of the mold assembly until the chamber 22 was filled. A single port hole 14 acted as a vent hole and was located on the thicker side of the lens chamber assembly. The vent 14 allowed egress of gases. After standard thermoset curing, the gasket means 24 was removed.

RESULTS OF EXAMPLE 4

The final lens product showed no bubbles on the thicker side of the lens, where the vent hole 14 was located. Some displacement of the embedded layer 32 was observed at the fill port 16, as the thermosetting material flowed freely about the unsupported edge of the embedded layer 32.

EXAMPLE 5

Figure 7A:
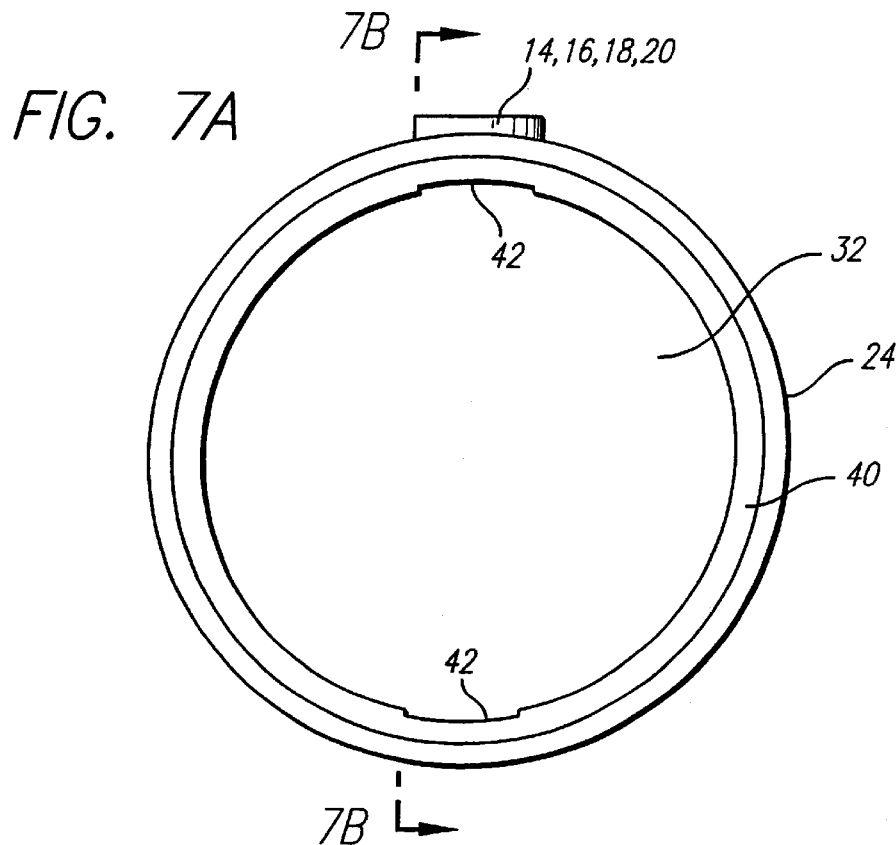
FIG. 7A is a top view of a side-fill molding apparatus having a slot-shaped fill port.
Figure 7B:
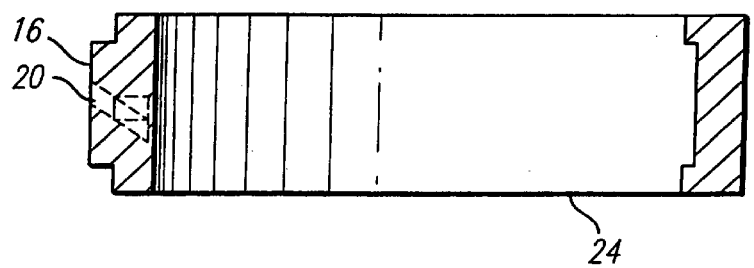
FIG. 7B is a side view, partial cross-section, of a side-fill molding apparatus having a slot-shaped fill port.
Figure 7C:
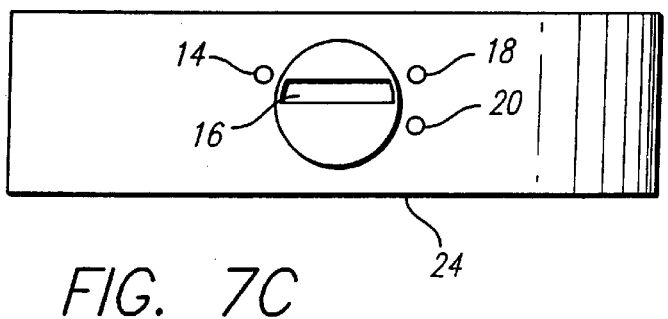
FIG. 7C is a front view of a side-fill molding apparatus having a slot-shaped fill port.
Figure 7D:
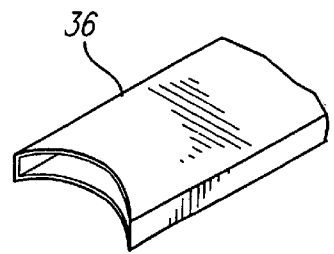
FIG. 7D is a side view of a slot-shaped fill nozzle.

A slot-shaped port hole 16 acted as the fill port to introduce, in a controlled manner, the thermosetting resin material along the edge axis of the embedded layer 32, as seen in FIG. 7A–7D. The thermosetting material used was approximately 1000 centipoise. Two port holes 14, 18 acting as vent holes were located above the edge axis of the embedded material 32, which was on the thinner side of the lens to allow egress of any gases on the front side of the lens surface. An additional vent port 20 was located below the edge axis of the embedded material 32, which was located on the thicker side of the lens to allow egress of any gases on the back side of the lens surface. A curved fill nozzle 36 acted as the filling tube, as seen in FIG. 7D. The curved fill nozzle 36 was shaped to fit and be inserted into the slot-shaped port 16 and was used to admit the composition of high viscosity hard resin thermoset monomer along the passageway 28 in the gasket means 24 around the embedded layer 32 to the lens chamber 22 of the mold assembly, until the chamber 22 was filled. After standard thermoset curing, the gasket means 24 was removed.

RESULTS OF EXAMPLE 5

The final lens product showed no displacement of the embedded layer and no gas bubbles within the lens.

EXAMPLE 6

Figure 8A:
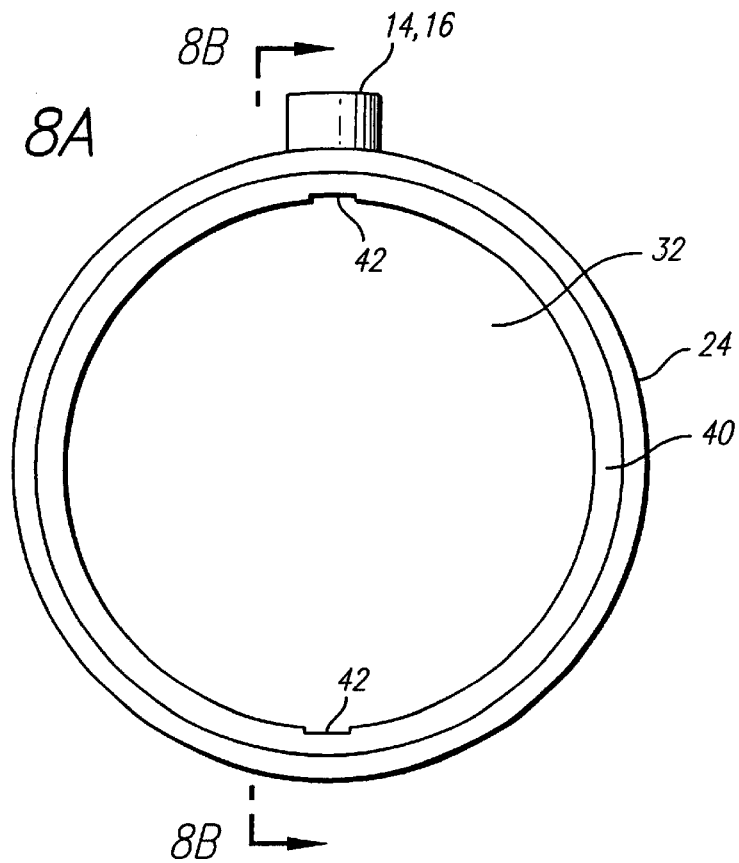
FIG. 8A is a top view of a side-fill molding apparatus having a fill port with a central baffle.
Figure 8B:
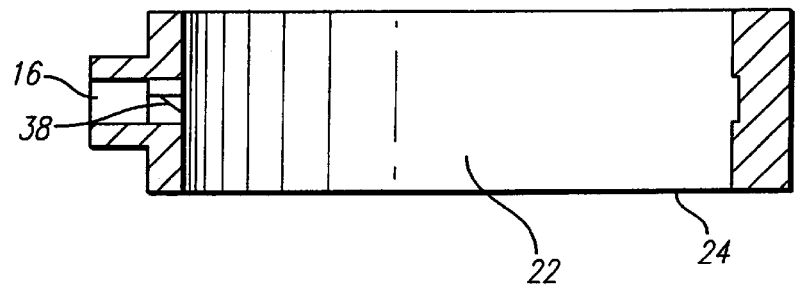
FIG. 8B is a side view, partial cross-section, of a side-fill molding apparatus having a fill port with a central baffle.
Figure 8C:
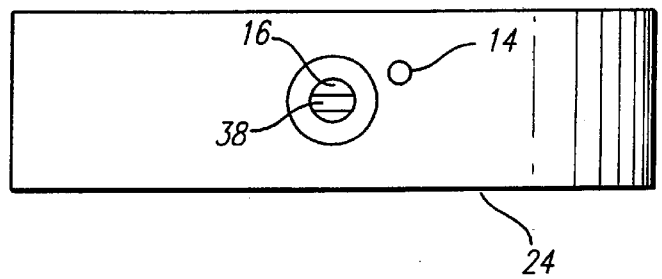
FIG. 8C is a front view of a side-fill molding apparatus having a fill port with a central baffle.

As illustrated in FIG. 8A–8C, a single port hole 16 acted as a fill hole and was located along the axis of the embedded layer 32. A single vent hole 14 was located below the axis of the embedded layer 32. Within the fill hold 16 was a central baffle 38 that directed the thermosetting material to both sides of the embedded layer 32, while limiting flow contact with the embedded layer 32. The embedded layer 32 was a thin polarizing film that was placed in the mold assembly. A needle acted as the filler tube 36 and was inserted into the fill hole 16 to admit a variant of CR-39®-type hard resin thermoset monomer along the passageway 28 to the lens chamber 22 of the mold assembly until the chamber 22 was filled. After standard thermoset curing, the gasket means 24 was removed.

RESULTS OF EXAMPLE 6

The final lens product showed no displacement of the polarizing film and no gas bubbles within the lens.

EXAMPLE 7

The procedure of Example 1 through 6 can be followed by substituting for a variant of CR-39®-type resin thermosetting material a composition comprising a mixture of the thermosetting resin material and silica, treated polymer particles, dye or colorant particles.

EXAMPLES 8 to 12

The procedure of Example 1 through 7 can be followed by substituting for the polarizing film, an embedded layer comprising photochromic material, tinted material, impact-resistant material, material having special light adsorption characteristics, or a material having light-controlling characteristics.

The following references are incorporated herein by reference: Roscrow, et al., U.S. Pat. No. 4,522,768; Laliberte, U.S. Pat. No. 4,090,830; Blum, U.S. Pat. No. 4,873,029; Orlosky, U.S. Pat. No. 4,693,446; and Ehritt, U.S. Pat. No. 4,789,318; Greshes, 4,190,621; Godwin, et al., 4,227,673; and U.S. Provisional Application No. 60/109,498.

Although the foregoing invention has been described in some detail by way of illustration and example for purposes of clarity and understanding, it will be obvious that various modifications and changes which are within the knowledge of those skilled in the art are considered to fall within the scope of the appended claims.

What is claimed is:

1. A method for making a polymer lens comprising:
    assembling a mold comprising first and second mold members spaced apart from one another by a gasket to define a chamber, the gasket having an annular body defining a first port hole and a second port hole adjacent thereto;
    placing an embedded layer within the chamber, wherein the port holes are at a location selected from above, below, or a combination thereof, the embedded layer;

injecting a first composition through one of the two port holes to fill the chamber, wherein the port holes are disposed about the embedded layer such that the first composition is injected above the embedded layer and a second composition is injected below the embedded layer; and curing said first and second composition to form a lens having an embedded layer therein.

2. The method of claim 1, wherein said port holes are round-shaped, oval-shaped, slot-shaped, or a combination thereof.

3. The method of claim 1, wherein at least one of the holes extends through said annular body at an angle between about 0 and −90 degrees.

4. The method of claim 3, wherein the angle is between about −20 and −90 degrees.

5. The method of claim 1, wherein said first composition comprises a combination of a thermosetting material and at least one of impact-resistant material, abrasion-resistant material, photochromic material, tinted material, high viscosity material, low refractive index material, high refractive index material.

6. The method of claim 1, wherein said embedded layer is a film.

7. The method of claim 6, wherein said film is a polarizer, photochromic material, tinted material, impact-resistant material, material having light adsorption characteristics, or a material having light-controlling characteristics.

8. The method of claim 1, wherein said port holes are linearly aligned along said embedded layer.

9. A method for making a polymer lens comprising:

providing a mold assembly for casting plastic lenses, said assembly including a first and second mold members spaced apart from one another by a gasket to define a chamber within which a lens is to be cast, said gasket comprising an annular body having at least three port holes therethrough, an embedded layer, at least one port hole is in fluid communication with said chamber below said embedded layer and at least one port hole is in fluid communication with the chamber above said embedded layer;

placing said composition in at least one of the port holes, whereby to fill said mold while venting gases through another of the port holes; and curing said composition whereby to form said lens.

10. The method of claim 1, wherein said second composition comprises a combination of a thermosetting material and at least one of impact-resistant material, abrasion-resistant material, photochromic material, tinted material, high viscosity material, low refractive index material, high refractive index material.

11. A method for making a polymer lens comprising:

assembling a mold comprising first and second mold members spaced apart from one another by a gasket to define a chamber, the gasket having an annular body defining a first port hole and a second port hole;

placing an embedded layer within the chamber, wherein one port hole is above the embedded layer and the other port hole is below the embedded layer;

injecting a composition through one of the two port holes to fill the chamber while venting gases through the other port hole; and curing the composition to form a lens having an embedded layer therein.

12. The method of claim 11, wherein the port holes are round-shaped, oval-shaped, slot-shaped, or a combination thereof.

13. The method of claim 11, wherein at least one of the port holes extends through the annular body at an angle between about 0 and −90 degrees.

14. The method of claim 11, wherein the composition comprises a combination of a thermosetting material and at least one of impact-resistant material, abrasion-resistant material, photochromic material, tinted material, high viscosity material, low refractive index material, high refractive index material.

15. The method of claim 11, wherein at least one of the holes extends through the annular body at an angle between about −20 and −90 degrees.

16. The method of claim 11, wherein the embedded layer is a film.

17. The method of claim 16, wherein the film is a polarizer, photochromic material, tinted material, impact-resistant material, material having light adsorption characteristics, or a material having light-controlling characteristics.

* * * * *